(12) United States Patent
Biermann et al.

(10) Patent No.: US 12,546,386 B2
(45) Date of Patent: Feb. 10, 2026

(54) GEARBOX ARRANGEMENT COMPRISING A STEPPED PLANETARY REDUCTION, A DIFFERENTIAL, AND AN ELECTRICALLY OPERABLE AXLE DRIVE TRAIN

(71) Applicant: Schaeffler Technologies AG & Co. KG, Herzogenaurach (DE)

(72) Inventors: Thorsten Biermann, Wachenroth (DE); Christian Dassler, Herzogenaurach (DE); Harald Martini, Herzogenaurach (DE); Inaki Fernandez, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/866,999

(22) PCT Filed: May 10, 2023

(86) PCT No.: PCT/DE2023/100335
§ 371 (c)(1),
(2) Date: Nov. 18, 2024

(87) PCT Pub. No.: WO2023/227160
PCT Pub. Date: Nov. 30, 2023

(65) Prior Publication Data
US 2025/0305570 A1    Oct. 2, 2025

(30) Foreign Application Priority Data
May 24, 2022   (DE) .................... 10 2022 113 018.5

(51) Int. Cl.
*F16H 37/08*    (2006.01)
*B60K 1/00*    (2006.01)
(Continued)

(52) U.S. Cl.
CPC ............. *F16H 37/082* (2013.01); *B60K 1/00* (2013.01); *B60K 17/165* (2013.01); *F16H 48/10* (2013.01);
(Continued)

(58) Field of Classification Search
CPC .. F16H 37/082; F16H 48/10; F16H 2048/106; F16H 48/11; B60K 1/00; B60K 2001/001
See application file for complete search history.

(56) References Cited

U.S. PATENT DOCUMENTS 9,829,084 B2    11/2017  Swales et al.
10,527,143 B2 *  1/2020  Wurzberger .............. F16H 1/28
11,485,226 B2 * 11/2022  Fernandez .............. F16H 48/11

FOREIGN PATENT DOCUMENTS

DE    102010048837 A1    4/2012
DE    102012208797 A1    11/2013
(Continued)

OTHER PUBLICATIONS

Authors: Erik Schneider, Frank Fickl, Bernd Cebulski and Jens Liebold, Title: Highly Integrative and Flexible Electric Drive Unit for E-Vehicles, Source: the German automotive magazine ATZ, vol. 113, May 2011, pp. 10-14.

*Primary Examiner* — Sherry L Estremsky

(57) ABSTRACT

A transmission arrangement includes a planetary transmission and a differential. The planetary transmission includes a planetary sun gear, a ring gear, a gear carrier, planetary gear shafts, and stepped planetary gears. The planetary gears are mounted in the gear carrier and engaged with the planetary sun gear and the ring gear. The differential includes first and second sun gears, balance shafts axially overlapping the planetary gear shafts, and first and second pinion gears. The first pinion gears are arranged on the balance shafts and engaged with the first sun gear, and the second pinion gears are engaged with the first pinion gears
(Continued)

and the second sun gear. The planetary gear shafts or the balance shafts have an end face recess, or the planetary gear carrier has first receptacles for the planetary gear shafts and second receptacles for the balance shafts, with the balance shafts contacting the planetary gear shafts.

13 Claims, 9 Drawing Sheets

(51) Int. Cl.
    *B60K 17/16*     (2006.01)
    *F16H 48/10*     (2012.01)
    *F16H 57/08*     (2006.01)

(52) U.S. Cl.
    CPC ...... *F16H 57/082* (2013.01); *B60K 2001/001* (2013.01); *F16H 2048/106* (2013.01)

(56) References Cited

FOREIGN PATENT DOCUMENTS

| | | | | |
|---|---|---|---|---|
| DE | 102011079975 A1 | | 12/2013 | |
| DE | 102013205432 A1 | | 10/2014 | |
| DE | 102013225519 A1 | | 6/2015 | |
| DE | 102015110040 A1 | | 12/2015 | |
| DE | 102015214031 A1 | * | 1/2017 | ............. F16H 48/11 |
| DE | 102015214035 A1 | | 1/2017 | |
| DE | 102018127721 A1 | * | 5/2020 | ........... F16H 37/082 |
| DE | 102018128835 A1 | | 5/2020 | |
| DE | 102018128837 A1 | * | 5/2020 | ............. B60K 17/04 |
| DE | 102019119955 A1 | * | 1/2021 | ........... B60K 17/165 |
| DE | 102022004049 A1 | * | 5/2024 | ............... B60K 1/00 |
| EP | 2821672 B1 | | 12/2016 | |

* cited by examiner

GEARBOX ARRANGEMENT COMPRISING A STEPPED PLANETARY REDUCTION, A DIFFERENTIAL, AND AN ELECTRICALLY OPERABLE AXLE DRIVE TRAIN

CROSS-REFERENCE TO RELATED APPLICATIONS

This application is the United States National Phase of PCT Appln. No. PCT/DE2023/100335 filed May 10, 2023, which claims priority to German Application No. DE102022113018.5 filed May 24, 2022, the entire disclosures of which are incorporated by reference herein.

TECHNICAL FIELD

The present disclosure relates to a transmission arrangement of an electrically operable axle drive train of a motor vehicle, including a planetary transmission which can be coupled to a first drive shaft and a differential which can be coupled to a first output shaft and a second output shaft. The present disclosure further relates to an electrically operable axle drive train.

BACKGROUND

Electric motors are increasingly being used to drive motor vehicles to create alternatives to internal combustion engines that require fossil fuels. Significant efforts have already been made to improve the suitability of electric drives for everyday use and also to be able to offer users the driving comfort which they are accustomed to.

A detailed description of an electric drive can be found in an article in the German automotive magazine ATZ, volume 113, 05/2011, pages 10-14 by Erik Schneider, Frank Fickl, Bernd Cebulski and Jens Liebold with the title: "Hochintegrativ und flexibel—Elektrische Antriebseinheit für E-Fahrzeuge" [Highly Integrative and Flexible—Electric Drive Unit for Electric Vehicles], which is probably the closest prior art. This article describes a drive unit for an axle of a vehicle, which includes an electric motor that is arranged to be concentric and coaxial with a bevel gear differential, and a shiftable 2-speed planetary gear set is arranged in the power train between the electric motor and the bevel gear differential and is also positioned to be coaxial with the electric motor or the bevel gear differential or spur gear differential. The drive unit is very compact and allows for a good compromise between gradability, acceleration and energy consumption due to the shiftable 2-speed planetary gear set. Such drive units are also referred to as e-axles or electrically operable drive trains.

DE 10 2010 048 837 A1 discloses such a drive device having at least one electric motor and at least one planetary differential that can be driven by a rotor of the electric motor. The planetary differential has at least one planetary carrier that is operatively connected to a rotor of the electric motor, first planetary gears and second planetary gears, which are rotatably mounted on the planetary carrier, and a first sun gear and a second sun gear, each of which is operatively connected to an output shaft of the planetary differential. In this regard, the first planetary gears are in engagement with the first sun gear and each of the second planetary gears is in engagement with the second sun gear and with one of the first planetary gears. Furthermore, the sun gears are arranged coaxially with an axis of rotation of the rotor.

DE 10 2018 128 835 A1 shows a transmission device for a motor vehicle and a drive device having such a transmission device.

DE 10 2015 214 035 A1 shows an electronic drive unit for a motor vehicle, comprising an electric motor and a transmission arrangement connected thereto. The transmission arrangement has a transmission input stage and a differential connected thereto via a common planetary carrier, and the differential has a first and a second planetary set. The first planetary set meshes with a first sun and the second planetary set meshes with a second sun, and the two planetary sets of the differential mesh with one another in pairs.

U.S. Pat. No. 9,829,084 B2 shows an integrated gear assembly comprising a unified carrier assembly coupling a reduction gear set with a differential gear set.

SUMMARY

The present disclosure provides an improved transmission arrangement for an electrically operable axle drive train of a motor vehicle.

The pinion gears of the differential gear are arranged in phase, but not coaxially, with the stepped planetary gears of the planetary transmission. This allows for a compact design of the transmission arrangement to be achieved. Furthermore, this also improves the ease of assembly of the transmission arrangement, as the ring gear can be easily slid over the differential and thus mounted separately, which will be discussed in more detail below.

The transmission arrangement is intended in particular for use within an electrically operable axle drive train of a motor vehicle. An electrically operable drive train comprises an electric machine and, for example, a transmission arrangement according to the disclosure coupled to the electric machine. The transmission arrangement and the electric machine form a structural unit. This can be formed, for example, by means of a drive train housing, in which the transmission arrangement and the electric machine are accommodated together.

The electric machine may have a motor housing and/or the transmission may have a transmission housing, and the structural unit can then be implemented by fixing the transmission in relation to the electric machine. The transmission housing is a housing for accommodating a transmission. It has the task of guiding existing shafts via the bearings and giving the wheels (cam discs, where applicable) the degrees of freedom they require under all loads without impeding their rotational and possible path movement, as well as absorbing bearing forces and supporting torques. A transmission housing can be designed as single-shell or multishell, i.e., undivided or divided. For example, the transmission housing should be able to dampen noise and vibrations as well as safely absorb hydraulic fluid. The transmission housing may be formed from a metallic material, e.g., from aluminum, gray cast iron or cast steel, by means of a primary shaping process such as casting or die-casting, for example.

The motor housing encloses the electric machine. A motor housing can also accommodate the control and power electronics. The motor housing can furthermore be part of a cooling system for the electric machine, and can be designed such that hydraulic fluid can be supplied to the electric machine via the motor housing and/or the heat can be dissipated to the outside via the housing surfaces. In addition, the motor housing protects the electric machine and any electronics that may be present from external influences.

A motor housing can be formed, for example, from a metallic material. The motor housing can be formed from a metallic cast material, such as die-cast aluminum, die-cast magnesium, gray cast iron, or cast steel.

The electric machine is used to convert electrical energy into mechanical energy and/or vice versa, and generally comprises a stationary part referred to as a stator, stand, or armature, and a part referred to as a rotor or runner, and arranged movably, e.g., rotatably, relative to the stationary part. The electric machine can be configured as a radial flux machine or an axial flux machine.

The electric machine is dimensioned such that vehicle speeds of more than 50 km/h, e.g., more than 80 km/h, or more than 100 km/h can be achieved. The electric motor may have an output of more than 30 KW, e.g., more than 50 KW, or more than 70 kW. Furthermore, the electric machine may provide speeds greater than 5000 rpm, e.g., greater than 10,000 rpm, or greater than 12,500 rpm.

For the purposes of this application, motor vehicles are land vehicles that are moved by machine power without being bound to railroad tracks. A motor vehicle can be selected, for example, from the group of passenger cars, trucks, small motorcycles, light motor vehicles, motorcycles, motor buses/coaches or tractors.

The transmission arrangement can be coupled to the electric machine, which is designed to generate a drive torque for the motor vehicle. The drive torque may be a main drive torque, such that the motor vehicle is driven exclusively by the drive torque.

The drive shaft of the planetary transmission may be operatively connected to the rotor of the electric machine, so that a rotation of the rotor effects a rotation of the drive shaft of the planetary transmission.

The features listed individually can be combined with one another in a technologically meaningful manner and can define further embodiments. In addition, the features indicated are specified and explained in more detail in the description, wherein further embodiments are shown.

According to an example embodiment, the planetary gear shafts can be arranged radially offset to the corresponding differential balance shafts. The differential balance shafts may be offset radially inwards, which makes it possible to achieve a compact design of the transmission arrangement and favorable transmission ratios.

According to a further development, the pinion gears can be arranged and dimensioned such that they are surrounded by the ring gear without contact. This allows the ring gear to be slid axially over the differential, which makes it easier to assemble the transmission arrangement. The tip diameter of the internally toothed ring gear is, in this regard, larger than the pitch diameter of the pinion gears of the differential plus the tip diameter of the pinion gears. In this context, the toothing of the sun gear may partially overlap axially with the toothing of the ring gear.

Furthermore, according to an example embodiment, the planetary gear shafts and the differential balance shafts can overlap in the axial direction. This axial nesting can also be used to provide a transmission arrangement that is axially compact.

According to a further embodiment, the planetary gear shafts and/or the differential balance shafts can each have an end-face recess which extends in the axial direction. This has the effect that the two shafts can be mechanically coupled together.

Furthermore, the disclosure can also be further developed in such a way that the recess is formed in a circular or flattened manner. The circular recess can have the advantage that the planetary gear shafts do not rotate along about their respective axes of rotation in relation to the differential balance shaft. This ensures, for example, that the positions of the oil holes do not change over the service life of the drive due to an unintentional co-rotation of the planetary gear shaft, thus impairing the lubrication and cooling of the planetary gear transmission.

In an example embodiment, the planetary gear carrier can have first receptacles for mounting one of the planetary gear shafts in each case and second receptacles for mounting one of the differential balance shafts in each case. The differential balance shafts each have a contact surface with their respective corresponding planetary gear shaft, whereby a mechanical coupling can also be produced between the shafts.

The planetary gear shafts and a corresponding differential balance shaft in each case may be connected to one another in a form-fitting and additionally materially bonded manner by means of a resistance welding process.

In this regard, the planetary gear shaft and the differential balance shaft can overlap axially. A circular recess is then provided either on the differential balance shaft or on the planetary gear shaft of the stepped planetary gear set for this purpose. Depending on the variant, this initially creates either an anti-rotation lock for the planetary gear shaft or the differential balance shaft. In order to secure both shafts against rotation against one another and also axially, electrodes can be attached to the outside of the shafts, e.g., also after assembly, and both shafts can be welded together by applying a direct or alternating current. By applying an axial force via the electrodes, the shafts can, in this regard, be pressed together partially on the end faces in order to ensure a defined position of the materially bonded connection.

It is further conceivable that the planetary gear shafts and the differential balance shafts do not overlap axially, but instead abut against one another in a partially planar manner on the end faces. In this regard, both the planetary gear shafts and the differential balance shafts can be mounted in a blind hole in a common carrier. The blind holes may be designed such that they slightly overlap axially in order to allow the shafts to make contact at the end faces. In order to secure both shafts against rotation against one another and also axially, electrodes are attached to the outside of the shafts after assembly and both shafts are welded together by applying a direct or alternating current. By applying an axial force via the electrodes, the shafts are pressed against one another partially on the end faces in this regard.

The resistance heating heats the shafts until the required welding temperature is reached. Case-hardened extruded shafts can be reworked at the welding point by removing the carbon-containing hardened layer of the bolts on the end face. However, this is not absolutely necessary, but leads to an improvement in the quality of the welded joint due to the lower carbon content in the weld seam.

According to a further embodiment, the first sun gear can have a number of teeth $Z_s$ that is divisible by three, and the first toothing of the stepped planetary gear can have a number of teeth $ZP1$ and the second toothing of the stepped planetary gear can have a number of teeth $ZP2$, wherein the ratio can be $ZP1=3*ZP2$. The number of teeth of the large planet ($ZP1$)/first toothing may be 66, and the number of teeth of the small planet ($ZP2$)/second toothing may be 22.

The number of teeth of the first sun gear $Z_s$ can be 42. The number of teeth of the ring gear ($ZH$) may be 97. The transmission ratio of the planetary transmission stage may be between 6.5-8, e.g., between 7-8.5 and, for example, 7.93, wherein the transmission ratio is determined from $i=ZH/Z_s \times ZP1/ZP2+1$.

The differential may be configured as an asymmetrical spur gear differential, in which the tip diameter of the small sun gear is smaller than the root diameter of the large sun gear. The profile shift coefficient of the small sun gear may be <−0.8, the profile shift coefficient of the large sun gear may be >0.8. Both sun gears may have the same number of teeth.

The present disclosure also provides an electrically operable axle drive train of a motor vehicle, including an electric machine and a transmission arrangement that can be driven by the electric machine, according to the disclosure.

BRIEF DESCRIPTION OF THE DRAWINGS

The present disclosure is explained in more detail below with reference to figures without limiting the general concept of the disclosure.

In the drawings.

DETAILED DESCRIPTION

Figure 1:
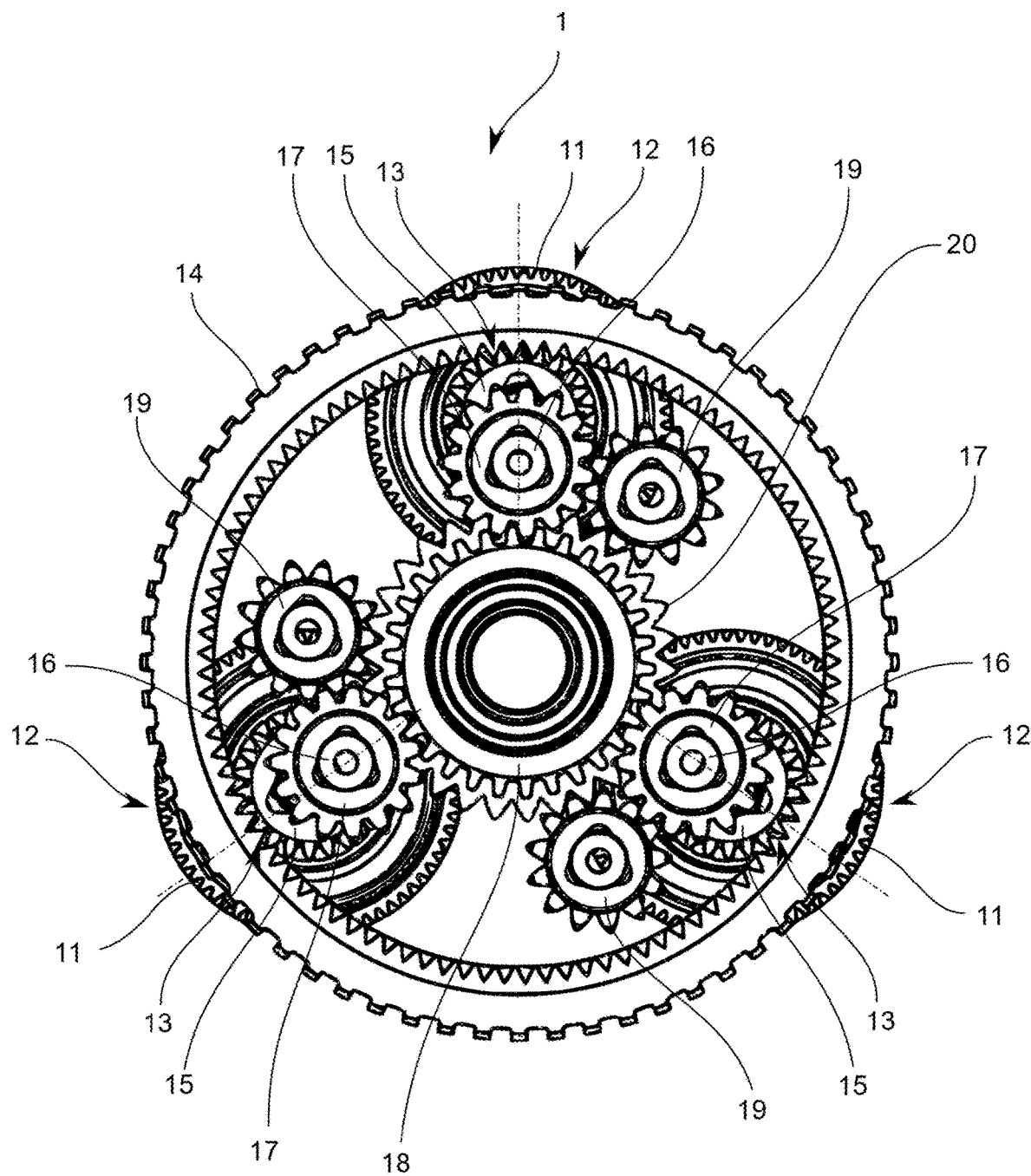
FIG. 1 shows a transmission arrangement in a cross-sectional view.
Figure 8:
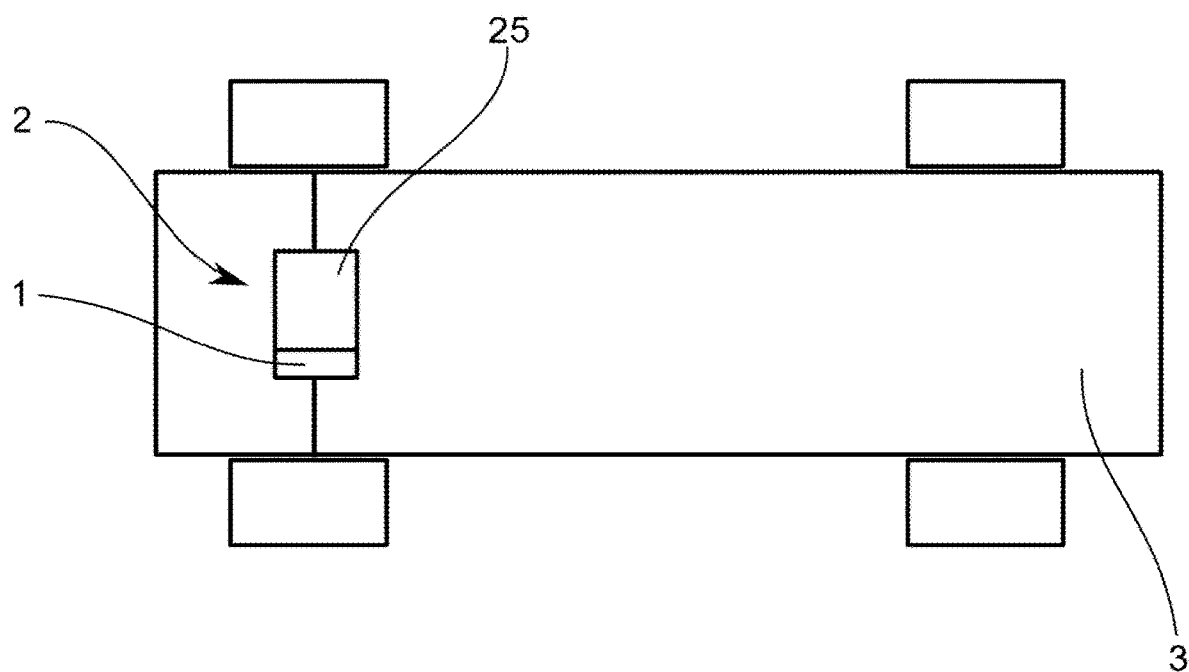
FIG. 8 shows a motor vehicle with an electrically operable axle drive train in a schematic block diagram.

FIG. 1 shows a transmission arrangement 1 of an electrically operable axle drive train 2 of a motor vehicle 3, as also sketched by way of example in FIG. 8.

Figure 9:
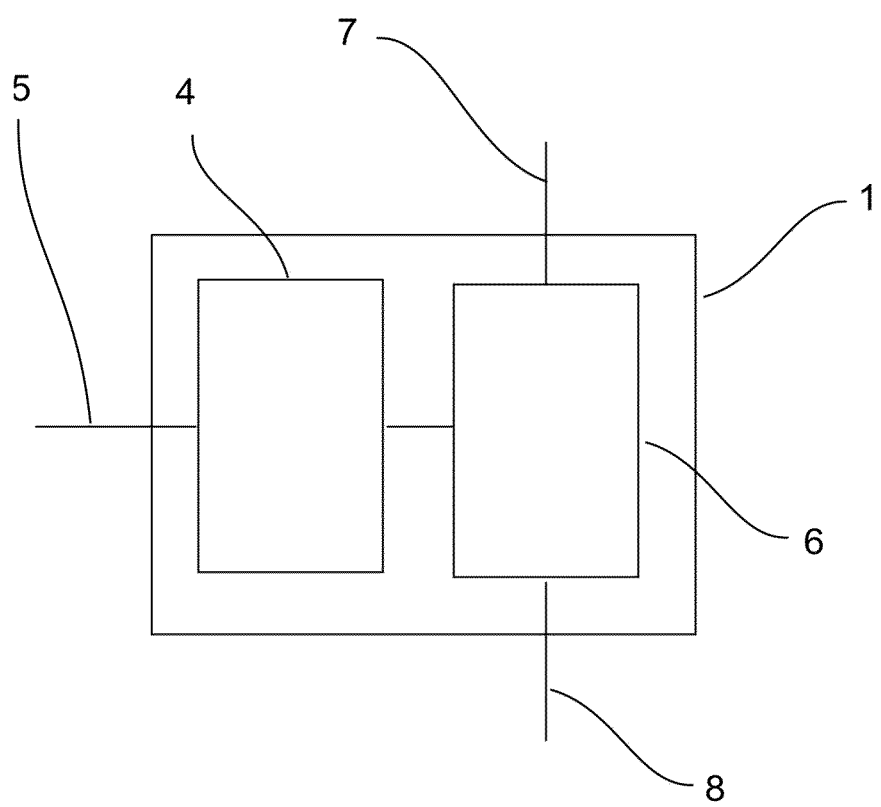
FIG. 9 shows a transmission arrangement in a schematic block diagram.

The transmission arrangement 1 includes a planetary transmission 4 which can be coupled to a first drive shaft 5 and a differential 6 which can be coupled to a first output shaft 7 and a second output shaft 8, which can also be easily seen in FIG. 9. In this regard, the drive shaft 5 of the planetary transmission 4 is coupled to the electric machine 25 (ref. FIG. 8) in a torque-transmitting manner.

Figure 5:
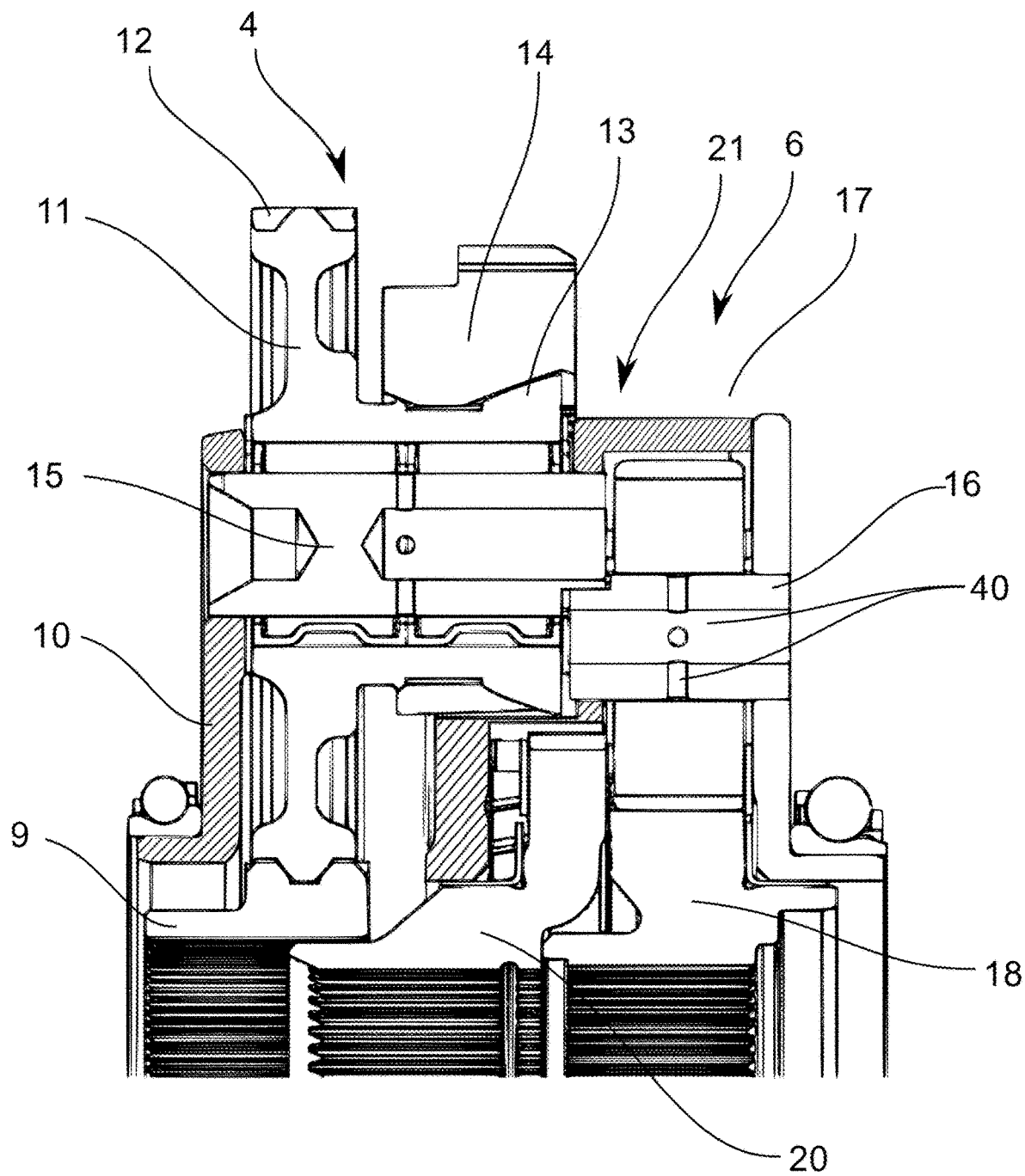
FIG. 5 shows a second embodiment of a transmission arrangement in an axial sectional view.

The planetary transmission 4 has a first sun gear 9 and a plurality of stepped planetary gears 11 which are in engagement with the first sun gear 9 and are rotatably mounted in a first planetary gear carrier 10 (ref. FIG. 5) on a planetary gear shaft 15 in each case, with a first toothing 12 and a second toothing 13 in each case, which move rotationally about the first sun gear 9, and a ring gear 14 which is arranged coaxially with respect to the first sun gear 9 and on which the planetary gears 11 roll. The first toothing 12 engages with the first sun gear 9, while the second toothing 13, having a pitch diameter smaller than that of the first toothing 12, meshes with the ring gear 14. In this respect, the planetary transmission 4 can initially be considered to be of a conventional design.

The planetary gear shafts 15 are each coupled to a differential balance shaft 16 of the differential 6. A first pinion gear 17 is rotatably arranged on the differential balance shafts 16 in each case and is in engagement with a first sun gear 18 in each case, which can be coupled to the first output shaft 7, and the first pinion gear 17 further meshes with a second pinion gear 19, which in turn engages with a second sun gear 20 which can be coupled to the second output shaft 8. The first sun gear 18 has a tip diameter that is smaller than the root diameter of the second sun gear 20, and both sun gears have the same number of teeth.

Figure 3:
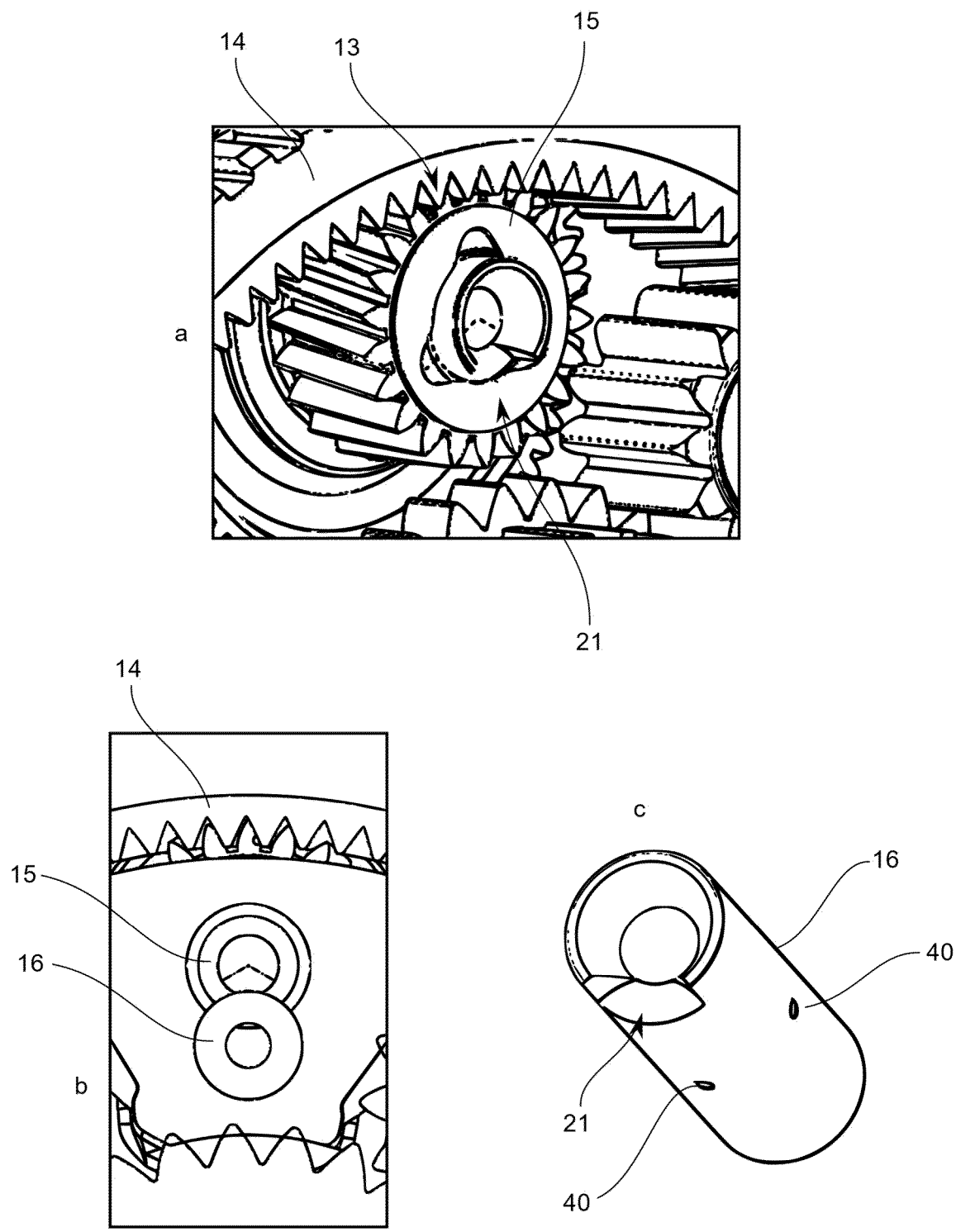
FIG. 3 shows a first variant of the first embodiment shown in FIG. 2 with a circular recess on the differential balance shaft in three different views.
Figure 4:
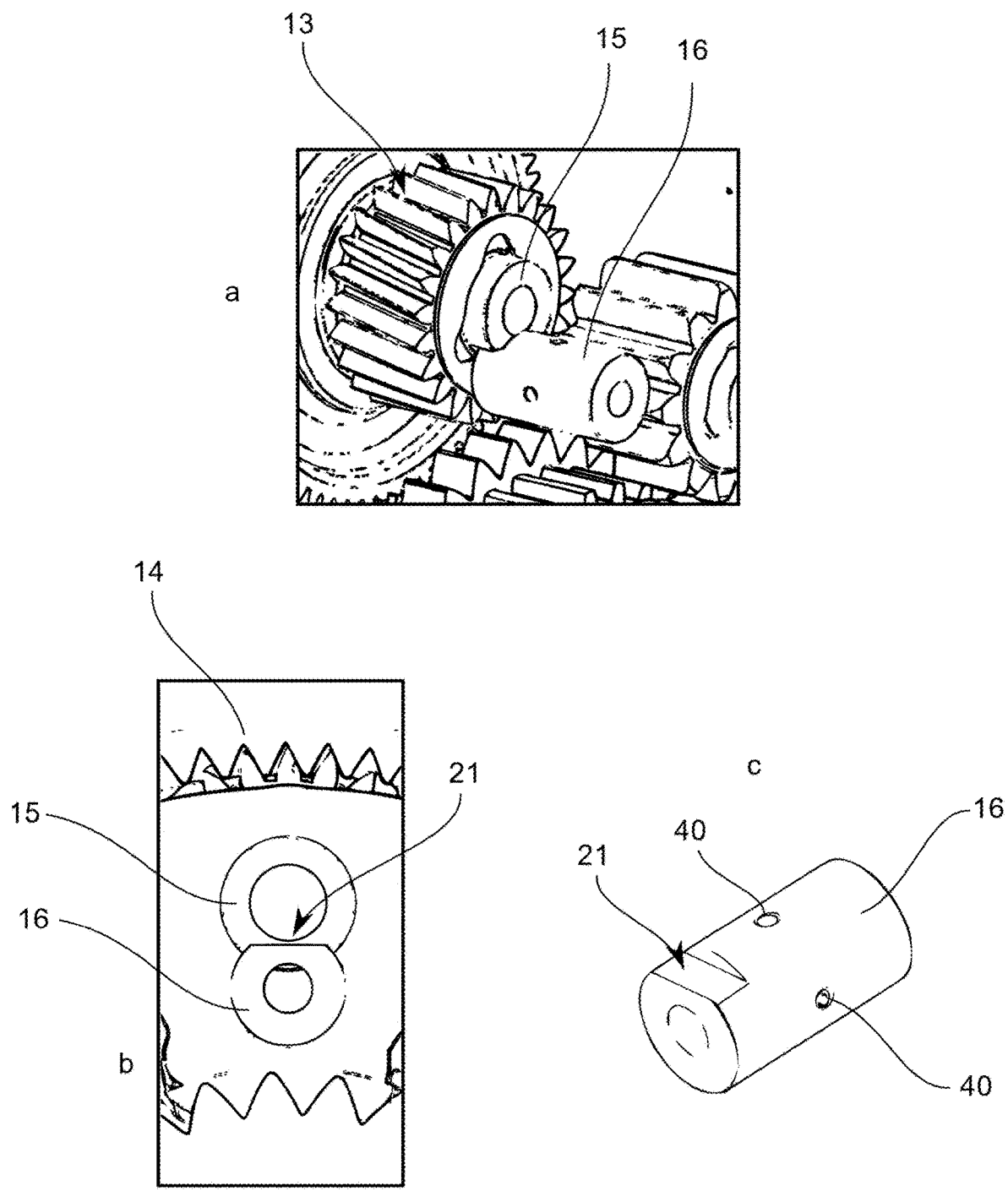
FIG. 4 shows a second variant of the first embodiment shown in FIG. 2 with a flattened recess on the differential balance shaft in three different views.

In order to lubricate the plain bearing between the differential balance shafts 16 and the pinion gears 17, 19, the differential balance shafts 16 have axially and radially extending oiling channels 40 (ref. FIGS. 3-5).

As can be seen particularly clearly from FIG. 1, in the transmission arrangement 1 according to the disclosure, the planetary gear shafts 15 are arranged in phase with the corresponding differential balance shafts 16, i.e., they are not offset from one another in the circumferential direction, but their respective axes of rotation each lie in a common radial plane.

Figure 2:
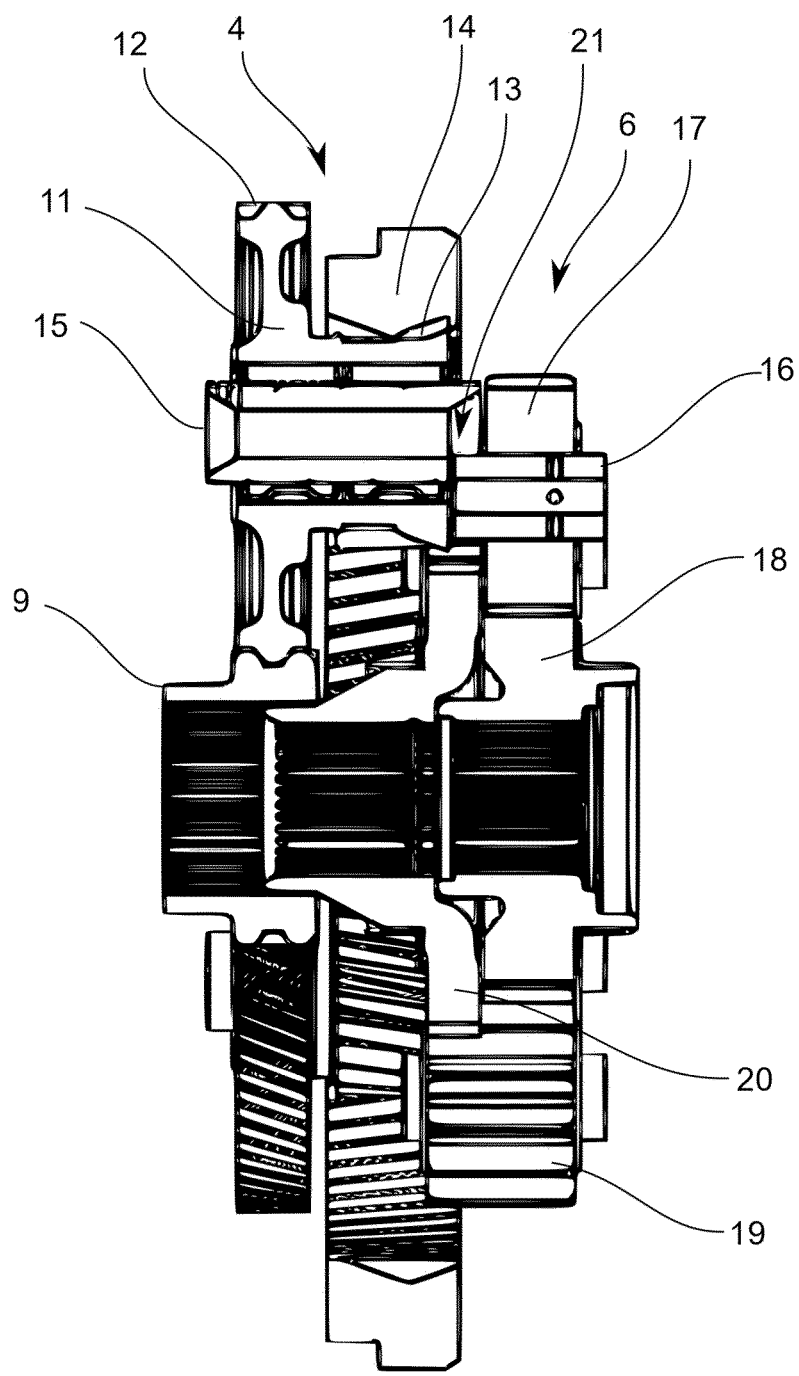
FIG. 2 shows a first embodiment of a transmission arrangement in an axial sectional view.

From the synopsis of FIGS. 1-2, it can also be seen, for example, that the planetary gear shafts 15 are arranged offset radially inwards in relation to the corresponding differential balance shafts 16. FIG. 2 also clearly shows that the pinion gears 17, 19 are arranged and dimensioned such that they are surrounded by the ring gear 14 without contact, so that the ring gear 14 can be slid from the axial direction over the pinion gears 17, 19 onto the planetary gears 11, i.e., from right to left in the example shown in FIG. 2. The toothing of the sun gear 20 partially overlaps axially with the toothing of the ring gear 14.

As shown in the embodiments of FIGS. 2-5, the planetary gear shafts 15 and the differential balance shafts 16 can overlap in the axial direction. For this purpose, the planetary gear shafts 15 and/or the differential balance shafts 16 each have an end-face recess 21 which extends in the axial direction. FIG. 3 shows an embodiment in which the recess 21 is formed in a circular manner, while FIG. 4 shows an embodiment in which the recess 21 is formed in a flattened manner. In both cases, the respective shafts 15, 16 must be mounted in the correct direction so that they can correspondingly engage with one another in a form-fitting manner.

Subfigure a of FIG. 3 shows an embodiment in which the planetary gear shaft 15 has a circular recess 21, while Subfigure c of FIG. 3 discloses the circular recess 21 on a differential balance shaft 16. The radial offset of the shafts 15, 16 in relation to one another and their arrangement in phase can also be clearly seen in Subfigure b of FIG. 3.

FIG. 4 shows a version of the shafts 15, 16 with a flattened recess 21 in each case. Here, too, the radial offset of the shafts 15, 16 in relation to one another and their arrangement in phase can be clearly seen in Subfigure b of FIG. 4.

The recess 21 thus creates a form-fit between a planetary gear shaft 15 and an associated differential balance shaft 16 in each case, so that the shafts 15 and 16 cannot rotate relative to one another about their respective axes of rotation. In addition to the form-fit, it would also be possible in principle to connect a planetary gear shaft 15 and an associated differential balance shaft 16 to one another in a materially bonded manner by means of resistance welding.

FIG. 5 shows the embodiments known from FIGS. 2-4 with an axial overlap of the shafts 15, 16, but with the planetary gear carrier 10 shown.

Figure 7:
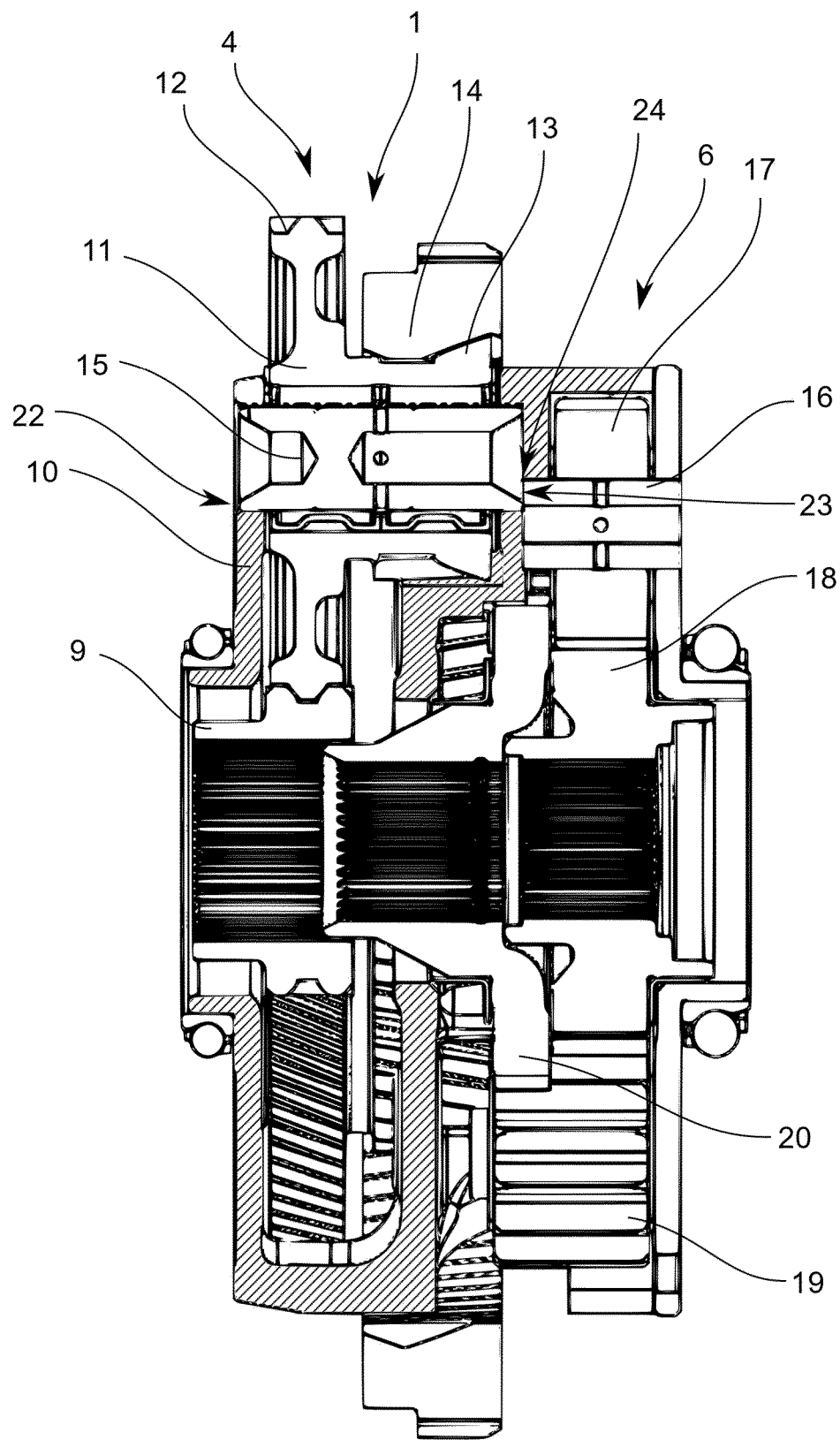
FIG. 7 shows a third embodiment of a transmission arrangement in a schematic axial sectional view.

What can be seen in FIG. 7 is a further embodiment of the transmission arrangement 1 wherein the planetary gear carrier 10 has first receptacles 22 for mounting one of the planetary gear shafts 15 in each case and second receptacles 23 for mounting one of the differential balance shafts 16 in each case. The differential balance shafts 16 each have a contact surface 24 with their respective corresponding planetary gear shaft 15. The planetary gear shafts 15 and a corresponding differential balance shaft 16 in each case can be connected to one another in a materially bonded manner by means of a resistance welding process in this regard.

Figure 6:
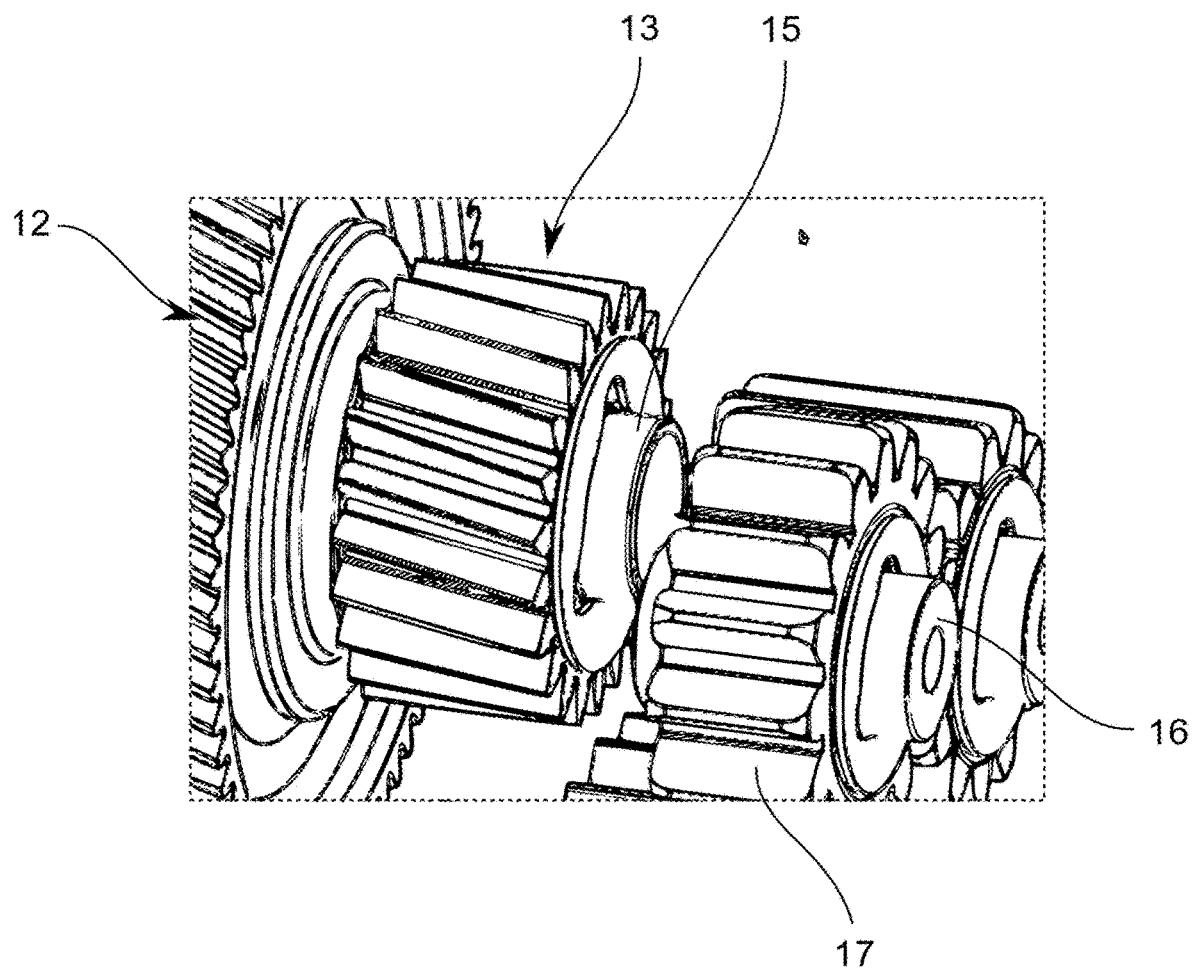
FIG. 6 shows a detailed representation of the planetary gear shaft and the differential balance shaft in a perspective view.

FIG. 6 shows the arrangement of the shafts 15, 16 without the representation of the planetary gear carrier 10.

In the embodiment shown in FIG. 7, the planetary gear carrier 10 has two blind holes arranged in phase, which partially overlap radially.

The planetary gear shaft 15 and the differential balance shaft 16 thus abut against one another on the end faces, which can be clearly seen in FIG. 7. In this embodiment, the shafts 15, 16 do not have to be mounted in alignment with one another. There is no mechanical anti-rotation lock between the shafts 15, 16, as in the exemplary embodiments of FIGS. 2-5.

REFERENCE NUMERALS

1 Transmission arrangement
2 Axle drive train
3 Motor vehicle
4 Planetary transmission
5 Drive shaft
6 Differential
7 Output shaft
8 Output shaft
9 Sun gear
10 Planetary gear carrier
11 Planetary gears
12 Toothing
13 Toothing
14 Ring gear
15 Planetary gear shaft
16 Differential balance shaft
17 Pinion gear
18 Sun gear
19 Pinion gear
20 Sun gear
21 Recess
22 Receptacles
23 Receptacles
24 Contact surface
25 Electric machine
40 Oiling channels

The invention claimed is:

1. A transmission arrangement of an electrically operable axle drive train of a motor vehicle, comprising a planetary transmission which can be coupled to a first drive shaft and a differential which can be coupled to a first output shaft and a second output shaft, the planetary transmission having a first planetary sun gear and a plurality of stepped planetary gears which are in engagement with the first planetary sun gear and are rotatably mounted in a first planetary gear carrier in each case on a planetary gear shaft, with a first toothing and a second toothing, which move rotationally about the first planetary sun gear, and a ring gear which is arranged coaxially with respect to the first planetary sun gear and on which the planetary gears roll, wherein the first toothing engages with the first planetary sun gear, while the second toothing, having a pitch diameter smaller than that of the first toothing, meshes with the ring gear, the planetary gear shafts each being coupled to a differential balance shaft of the differential, wherein a first pinion gear is rotatably arranged on the differential balance shafts in each case and is in engagement with a first sun gear in each case, which can be coupled to the first output shaft, and the first pinion gear further meshes with a second pinion gear, which in turn engages with a second sun gear which can be coupled to the second output shaft, wherein the first sun gear has a tip diameter that is smaller than the root diameter of the second sun gear and both sun gears have the same number of teeth, wherein:
the planetary gear shafts are arranged in phase with the corresponding differential balance shafts and
the planetary gear shafts and the differential balance shafts overlap in the axial direction,
wherein
either
the planetary gear shafts or the differential balance shafts each have an end-face recess which extends in the axial direction
or
the planetary gear carrier has first receptacles for mounting one of the planetary gear shafts in each case and second receptacles for mounting one of the differential balance shafts in each case, wherein the differential balance shafts each have a contact surface with their respective corresponding planetary gear shaft.

2. The transmission arrangement according to claim 1, wherein:
the planetary gear shafts are arranged radially offset to the corresponding differential balance shafts.

3. The transmission arrangement according to claim 1, wherein:
the pinion gears are arranged and dimensioned such that they are surrounded by the ring gear without contact.

4. The transmission arrangement according to claim 3, wherein the toothing of the second sun gear partially overlaps axially with the toothing of the ring gear.

5. The transmission arrangement according to claim 1, wherein:
the planetary gear shafts and a corresponding differential balance shaft in each case are connected to one another in a form-fitting and additionally materially bonded manner by means of a resistance welding process.

6. The transmission arrangement according to claim 1, wherein:
the first planetary sun gear has a number of teeth $Z_s$ that is divisible by three, and the first toothing of the stepped planetary gear has a number of teeth $ZP1$ and the second toothing of the stepped planetary gear has a number of teeth $ZP2$, wherein the ratio is $ZP1=3*ZP2$.

7. An electrically operable axle drive train of a motor vehicle, comprising an electric machine and a transmission arrangement that can be driven by the electric machine, according to claim 1.

8. A transmission arrangement, comprising:
a planetary transmission comprising:
a planetary sun gear arranged for coupling to a drive shaft;
a ring gear comprising a ring gear toothing;
a planetary gear carrier;
a plurality of planetary gear shafts;
a plurality of stepped planetary gears, each one mounted in the planetary gear carrier on a one of the plurality of planetary gear shafts, and comprising:
a first toothing engaged with the planetary sun gear and comprising a first pitch diameter; and a second toothing engaged with the ring gear toothing and comprising a second pitch diameter smaller than the first pitch diameter; and a differential comprising:
- a first sun gear arranged for coupling to a first output shaft, the first sun gear comprising a first sun gear toothing with a tip diameter and a number of teeth;
- a second sun gear arranged for coupling to a second output shaft, the second sun gear comprising a second sun gear toothing with a root diameter that is greater than the tip diameter and a same number of teeth as the first sun gear toothing;
- a plurality of balance shafts, each coupled with, arranged in phase with, and axially overlapping a one of the plurality of planetary gear shafts;
- a plurality of first pinion gears, each rotatably arranged on a one of the plurality of balance shafts and engaged with the first sun gear; and
- a plurality of second pinion gears, each engaged with a one of the plurality of first pinion gears and the second sun gear, wherein:

each of the plurality of planetary gear shafts comprise an end face recess extending in an axial direction;

each of the plurality of balance shafts comprise an end face recess extending in an axial direction; or the planetary gear carrier comprises a plurality of first receptacles and a plurality of second receptacles, each of the plurality of planetary gear shafts is mounted in a one of the plurality of first receptacles, each of the plurality of balance shafts is mounted in a one of the plurality of second receptacles, and each of the plurality of balance shafts comprises a contact surface contacting a one of the plurality of planetary gear shafts.

9. The transmission arrangement of claim 8, wherein each of the plurality of planetary gear shafts is arranged radially offset to a corresponding one of the plurality of balance shafts.

10. The transmission arrangement of claim 8, wherein each one of the plurality of first pinion gears and the plurality of second pinion gears is arranged and dimensioned to be surrounded by the ring gear without contacting the ring gear.

11. The transmission arrangement of claim 10, wherein the second sun gear toothing partially overlaps the ring gear toothing.

12. The transmission arrangement of claim 8, wherein each of the plurality of planetary gear shafts is connected to a corresponding one of the plurality of balance shafts by form-fitting and resistance welding.

13. The transmission arrangement of claim 8, wherein:
- the planetary sun gear comprises a number of teeth $Z_s$ that is divisible by three;
- the first toothing comprises a number of teeth $ZP1$; and
- the second toothing comprises a number of teeth $ZP2$ which is equal to the number of teeth $ZP1$ divided by 3.

* * * * *